(12) United States Patent
Cieślikowski et al.

(10) Patent No.: US 9,408,415 B2
(45) Date of Patent: Aug. 9, 2016

(54) METHOD AND UNIT FOR UNEVEN TRANSFERRING OF BEADS (71) Applicant: International Tobacco Machinery Poland Sp. z o.o., Radom (PL)

(72) Inventors: Bartosz Cieślikowski, Radom (PL); Radoslaw Figarski, Radom (PL); Jacek Figarski, Radom (PL); Kazimierz Makosa, Radom (PL)

(73) Assignee: International Tobacco Machinery Poland sp.zo.o., Radom (PL)

( * ) Notice: Subject to any disclaimer, the term of this patent is extended or adjusted under 35 U.S.C. 154(b) by 547 days.

(21) Appl. No.: 13/924,663

(22) Filed: Jun. 24, 2013

(65) Prior Publication Data
US 2014/0011652 A1 Jan. 9, 2014

(30) Foreign Application Priority Data

Jul. 4, 2012 (PL) .......................................... 399794

(51) Int. Cl.
*A24D 3/02* (2006.01)
*B65G 47/14* (2006.01)
(Continued)

(52) U.S. Cl.
CPC ................ *A24D 3/02* (2013.01); *A24D 3/0216* (2013.01); *B65G 29/02* (2013.01); *B65G 47/1428* (2013.01); *B65G 47/846* (2013.01)

(58) Field of Classification Search
CPC ............. A24D 3/00; A24D 3/02; A24D 3/04; A24D 3/0216; A24D 3/061; A24D 3/0229; A24D 3/0241; B65G 29/02; B65G 47/1428; B65G 47/846–47/848
USPC .................... 493/39, 44, 45, 47–50; 198/396, 198/397.01, 397.04, 397.05; 221/1, 7, 68, 221/72, 211, 265, 277, 282
See application file for complete search history.

(56) References Cited

U.S. PATENT DOCUMENTS 2,991,871 A * 7/1961 Lupo .................. B65G 47/1421
198/723
3,599,781 A * 8/1971 Hoadley ................. B65G 29/00
198/719

(Continued)

FOREIGN PATENT DOCUMENTS

CN 1972606 B 5/2007
CN 101765379 A 6/2010

(Continued)

OTHER PUBLICATIONS

Chinese search report in counterpart application CN2013102746252 filed Jul. 2, 2013.

(Continued)

*Primary Examiner* — Hemant M Desai
*Assistant Examiner* — Valentin Neacsu
(74) *Attorney, Agent, or Firm* — Oppedahl Patent Law Firm LLC (57) ABSTRACT

A unit for uneven transferring of a bead (2) stream in a filter manufacturing machine, from receiving pockets (18) to leading away pockets (21), through guiding grooves disposed on guiding plates, comprising two guiding plates (5, 6) situated on top of each other, whereas a guiding groove (5A) of the first guiding plate (5) and a guiding groove (6A) of the second guiding plate (6) intersect, forming at least one bead (2) guiding chamber, whereas at least one of the guiding plates (5, 6) is movable, wherein the receiving pockets (18) and the leading away pockets (21) are disposed along the circumference of the guiding plates (5, 6) so that the distances (S1, S2, T1, T2) between the successive pockets (18, 21) are alternately different.

4 Claims, 7 Drawing Sheets (51) Int. Cl.
 *B65G 47/84* (2006.01)
 *B65G 29/02* (2006.01)

(56) References Cited

U.S. PATENT DOCUMENTS

| | | | |
|---|---|---|---|
| 3,957,156 A * | 5/1976 | Schwenke | A24C 5/336 198/413 |
| 7,833,146 B2 | 11/2010 | Deal | |
| 7,975,877 B2 | 7/2011 | Garthaffner et al. | |
| 2002/0170266 A1 * | 11/2002 | Yamamoto | A61J 3/074 53/53 |
| 2005/0070409 A1 * | 3/2005 | Deal | A24D 3/0216 493/44 |
| 2009/0039102 A1 * | 2/2009 | Garthaffner | A24D 3/0216 221/277 |
| 2009/0145724 A1 * | 6/2009 | Garthaffner | A24D 3/0216 198/478.1 |
| 2009/0166376 A1 * | 7/2009 | Garthaffner | A24D 3/0216 221/282 |
| 2010/0099543 A1 * | 4/2010 | Deal | A24D 3/0216 493/49 |
| 2011/0053745 A1 * | 3/2011 | Iliev | A24D 3/061 493/47 |
| 2012/0015788 A1 * | 1/2012 | Righetti | A24D 3/0287 493/47 |
| 2012/0073935 A1 * | 3/2012 | Cieslikowski | A24D 3/0295 198/418 |
| 2012/0080043 A1 * | 4/2012 | Naenen | A24D 3/061 131/341 |

FOREIGN PATENT DOCUMENTS

| | | | | |
|---|---|---|---|---|
| CN | 101917877 A | 12/2010 | | |
| EP | 1427634 B1 | 4/2011 | | |
| GB | 922230 A | 3/1963 | | |
| PL | P.397838 | 1/2012 | | |
| WO | 2009/071271 | 6/2009 | | |
| WO | 2009/071272 | 6/2009 | | |
| WO | WO 2009071271 A1 * | 6/2009 | | A24D 3/0216 |
| WO | 2010115829 A1 | 10/2010 | | |
| WO | WO 2010115829 A1 * | 10/2010 | | A24D 3/0216 |
| WO | 2012057255 A1 | 5/2012 | | |
| WO | 2012175467 A1 | 12/2012 | | |

OTHER PUBLICATIONS

European search report dated Oct. 25, 2013 in counterpart application No. 13172584.8 filed Jun. 19, 2013.
Polish search report in counterpart application No. P.399794. Dated Feb. 11, 2013.

* cited by examiner

METHOD AND UNIT FOR UNEVEN TRANSFERRING OF BEADS

The object of the application is a method and a unit for uneven transferring of beads used in rod-shaped articles of the tobacco industry, particularly in cigarette filters.

This invention concerns the feeding of spherical or oval objects which are subsequently placed into the filter material or into the spaces between successive segments of the material forming a segment filter, or into the spaces between different elements of a cigarette i.e. between the filter portion and the tobacco portion. For reasons of simplification, any filter or tobacco elements will be hereinafter referred to as rod-shaped articles whereas the objects placed into or between them will be referred to as beads. Known products on the market are cigarettes the filters of which are provided with beads containing aromatic substances. The substances contained in the beads are released during smoking or yet before lighting up a cigarette by squeezing the filter resulting in crushing of the bead and releasing the aromatic substance contained inside.

In the production process, a problem which is difficult to solve and at the same time very significant is the feeding of individual beads to a machine forming filters at great speeds in a way which guarantees that the beads remain undamaged and a high feeding efficiency is maintained, i.e. each manufactured filter actually contains a bead. A particularly difficult problem is the feeding of beads at uneven distances, in segment filters in which the distances between individual spaces are different.

In known bead feeders, channels for feeding the beads to the area from which they are transferred to a bead delivery wheel are used, with the function of the said wheel to place the delivered beads into the filter material.

In the patent U.S. Pat. No. 7,975,877 B2 a bead feeder is disclosed in which the bead feeding unit is provided with a plurality of radially arranged channels connected with a bowl, where the channels rotate together with the bowl, and the beads are picked up by vacuum transfer by a bead transfer wheel from pockets situated at the outlets of the channels, and then transferred to a bead delivery wheel.

The document WO 2009/071271 has disclosed a bead feeder in which the bead feeding unit is provided with passageways rotating with the bowl, where the beads are fed to a bead delivery wheel after separating the lowermost bead from those situated above it using a stationary arched wedge-ended element.

The document WO 2009/071272 has disclosed a similar bead feeder, where the beads are fed to a bead delivery wheel using two plates having a plurality of openings and rotating relative to each other, and a bead is fed after aligning respective openings directly on top of each other.

The patent U.S. Pat. No. 7,833,146 B2 shows a device for feeding beads by curved channels from a bowl directly to a bead delivery wheel, where the channels rotate with the bead bowl, and the beads are picked up from the bowl by vacuum transfer.

The Polish patent application No. 397838, which belongs to the Applicant, shows a method of feeding aromatic beads by means of feeding channels which deliver the aromatic beads to the holding pockets. Then the beads are transferred to the receiving pockets of the bead transfer unit by means of movable feeding means synchronised with the transfer unit. Then the beads are fed to a guiding chamber formed at the intersection of a guiding groove of a first guiding plate and a guiding groove of a second guiding plate. As a result of a relative movement of the guiding plates, the guiding chamber is shifted in the radial direction to the leading away pocket. In that application, the beads are guided and delivered to the filter material at even distances.

The problem of feeding the beads is of a particular importance in case of feeding the beads into the spaces between successive segments of a segment filter, particularly in the so-called asymmetric configuration of filter rod cutting wherein the spaces into which the beads are to be fed occur at different distances. The individual filter segments are trimmed and arranged in an asymmetric way from the perspective of the final filter configuration. However, feeding of the beads is important also in case of inserting the beads into a continuous plait of the filter material.

In the devices presented above, the beads are transferred from holding pockets of the supply channels to transfer wheels or to a wheel delivering the beads to the filter material. However, in case of very high efficiencies, the construction of the elements can be so complicated or can require so much space that in order to ensure correct transferring of the beads a change of the diameter on which the beads are conveyed may be necessary. A change of the diameter can be also forced by the construction of elements picking up the beads in order to transfer them to a wheel delivering the beads into the filter material or into the space between the segments of the segment filter.

The objective of the invention is to develop a bead stream feeding unit in which the flow of beads in the form of a plurality of streams of individual beads spaced along a first arc with a first radius is transformed into a flow of beads in the form of an arched stream of individual beads along a second arc with a second radius.

The subject matter of the invention is a unit for uneven transferring of a bead stream in the tobacco industry machines, from receiving pockets to leading away pockets, through guiding grooves disposed on guiding plates; the said unit comprises two guiding plates situated on top of each other, whereas the guiding groove of the first guiding plate and the guiding groove of the second guiding plate intersect forming at least one bead guiding chamber, where at least one of the guiding plates is movable. A unit according to the invention is characterised in that the receiving pockets and the leading away pockets are disposed along the circumference of the guiding plates so that the distances between the successive pockets are alternately different.

The subject matter of the invention is also a unit for transferring a bead stream which according to the invention is characterised in that the proportion of the angular distance between the successive receiving pockets is equal to the proportion of angular distances between the successive picking up pockets.

The subject matter of the invention is also a unit for transferring a bead stream which according to the invention is characterised in that the feeding plate is provided with pockets disposed at such distances that the proportion of distances between the successive pockets is equal to the proportion of angular distances between the successive receiving pockets and the picking up pockets.

A bead transfer unit according to the invention allows transforming of a bead stream in such a way that at each stage of the bead transfer the position of the beads is fully controlled, i.e. it is not possible for a bead to take a random position, which would result for example in undesirable crushing of a bead. The unit can be used in any bead feeder in which it is necessary to change the radius of the arc on which a bead stream moves. The unit allows transferring of a stream of individual beads at a speed adjusted to highly efficient filter manufacturing machines while maintaining reciprocal distances between the beads, in accordance with the selected format.

The object of the invention has been shown in a preferred embodiment in a drawing in which.

Figure 1:
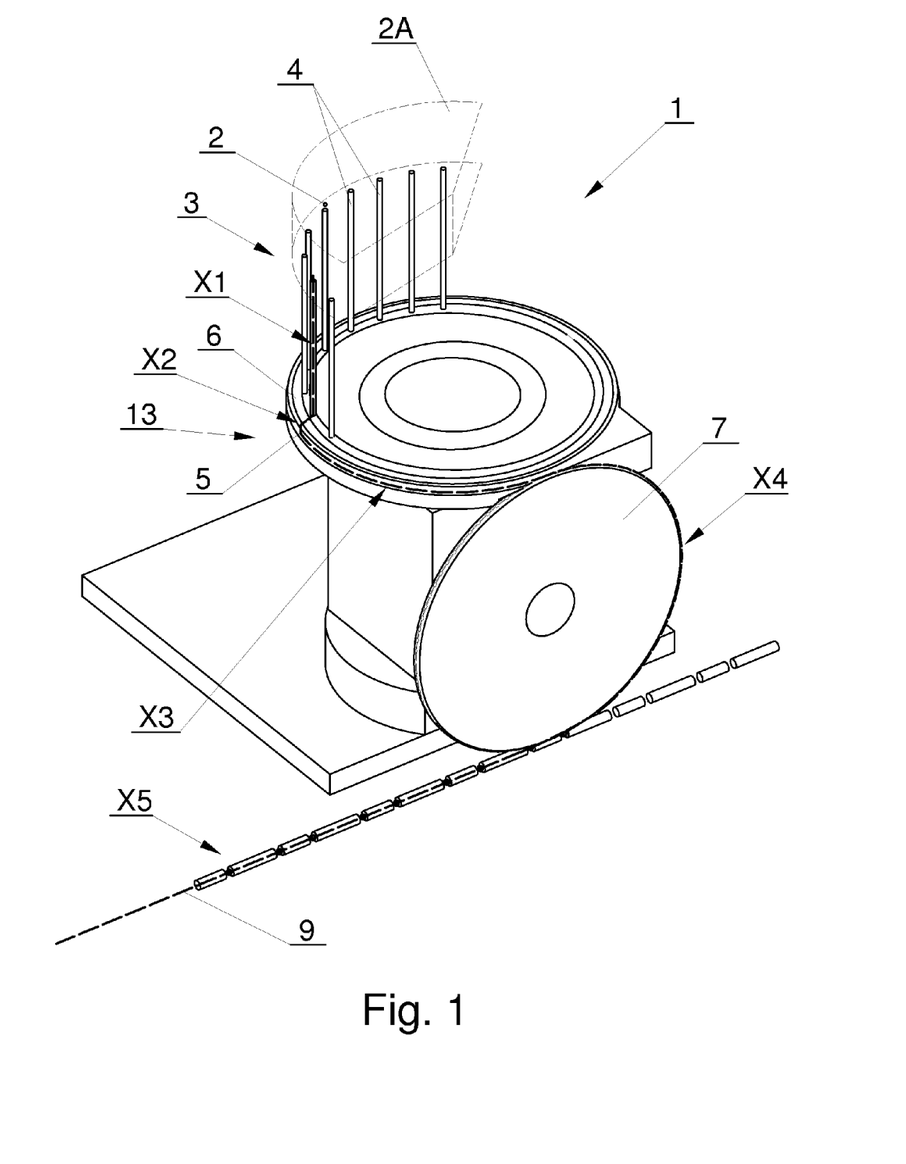
FIG. 1 shows a bead feeder in a perspective view.
Figure 2:
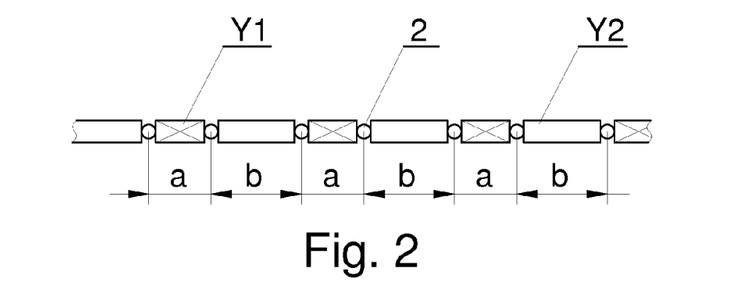
FIG. 2 shows an example sequence of filter segments and beads.
Figure 2A:
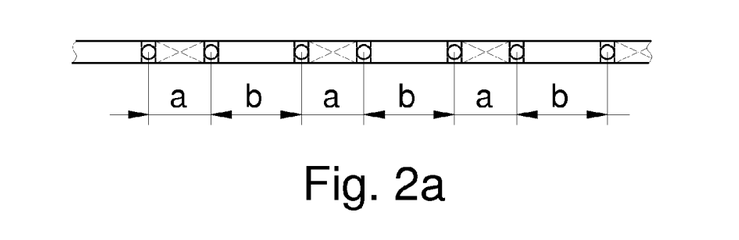
FIG. 2a shows a multi-segment filter roller formed of a sequence of segments of FIG. 2.
Figure 3:
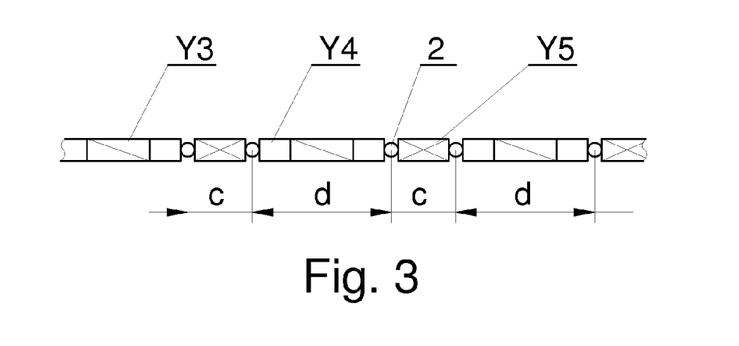
FIG. 3 shows another example sequence of filter segments and beads.
Figure 3A:
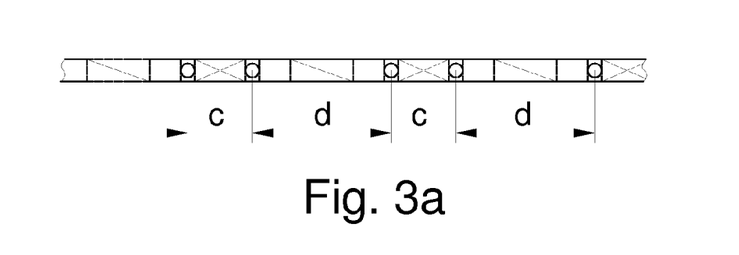
FIG. 3a shows a multi-segment filter roller formed of a sequence of segments of FIG. 3.

FIG. 1 shows a feeder 1 for beads 2 provided with a storage container 2A for beads 2, a bead stream feeding unit 3, a unit 13 for transferring the beads to a delivery wheel 7 and the delivery wheel 7 for delivering the beads 2 between the filter segments moving along a path 9. For reasons of simplification, the elements fastening individual units have not been shown. The unit 13 can be adapted to different distances between the successive filter segments. FIG. 2 shows a sequence of filter segments comprising alternately situated rod-shaped articles, in particular the filter segments Y1 and Y2 and the beads 2. The beads 2 are unevenly spaced in a sequence at the distances a and b; the transport pockets 23 on the delivery wheel 7 have to be adapted to such distances. The presented sequence of filter segments Y1 and Y2 and beads 2 is continuously wrapped into a paper wrapper so that an endless multi-segment filter roller is formed (FIG. 2a); the said roller is cut into multi-segment rods which are used in the manufacture of cigarette filters. A roller alternately formed of filter and tobacco portions will look similar. FIG. 3 shows another example sequence of filter segments and beads comprising the filter segments Y3, Y4 and Y5 and the beads 2 which is similarly wrapped into a paper wrapper in order to form a multi-segment roller. In this case the transport pockets 23 on the delivery wheel 7 have to be adapted to the distances c and d between the points in which the beads 2 are placed in the multi-segment roller (FIG. 3a). In both cases described above, the transport pockets 23 are unevenly spaced on the circumference of the delivery wheel 7. The described device can be also used for uneven feeding of beads or similar elements to the filter material strip of which an endless filter roller, which is cut into filter rods, is formed.

Figure 4:
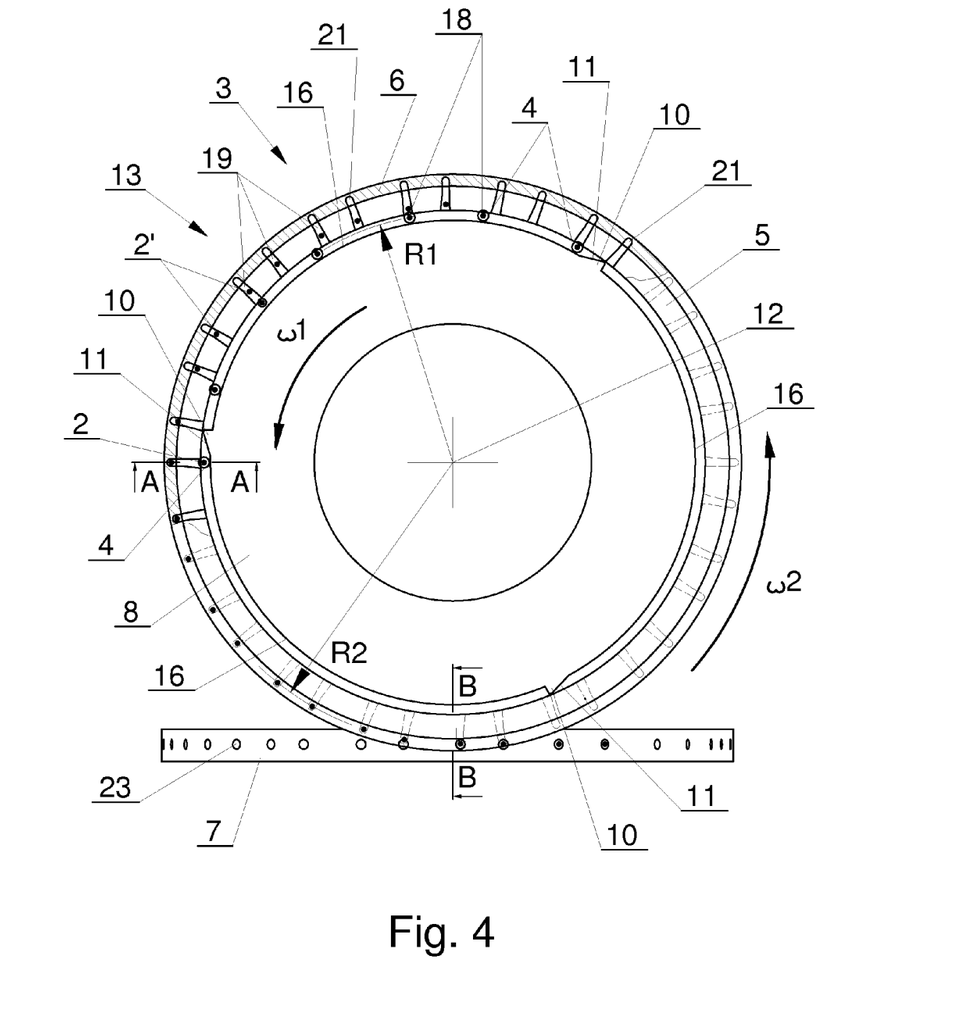
FIG. 4 shows a fragment of a bead feeder in a first embodiment in a top view.

FIG. 4 shows a fragment of a bead feeder 1 in a first embodiment in a top view. A bead 2 feeding unit 3 is provided with a plurality of stationary channels in the form of tubes 4 spaced on an arc with the radius R1, with the said tubes being supplied from the container 2A (in FIG. 1, one bead 2 above the inlet to one of the tubes 4 has been shown). At the outlets of the tubes 4 are situated holding pockets 14 (FIG. 6) from which the beads 2 are transferred to receiving pockets 18 belonging to a bead 2 transfer unit 13, whereas the receiving pockets 18 are situated in the area between a first guiding plate 5 and a second guiding plate 6. After passing through a substantially horizontal guiding channel 19 between the first guiding plate 5 and the second guiding plate 6, the beads 2 are then delivered to leading away pockets 21 moving on an arc with the radius R2. A bead 2' moves between the receiving pocket 18 and the inlet of the leading away pocket 21 along the guiding channel 19. The upper part of the guiding channel 19 is defined by a guiding groove 5A (FIG. 5) shaped on the bottom side of the first guiding plate 5 oriented towards the second guiding plate 6, the lower part of the guiding channel 19 is defined by a guiding groove 6A (FIG. 5) on the top side of the second guiding plate 6 oriented towards the first guiding plate 5, whereas one of the guiding grooves 5A and 6A is sufficient to guide the bead 2. The beads 2 are further transferred from the leading away pockets 21 to the transport pockets 23 on the circumference of the delivery wheel 7 which places the beads 2 between the filter segments Y1, Y2, Y3, Y4 and Y5 which are guided along a path 9. For the purpose of holding the beads 2, the transport pockets 23 can be supplied with the vacuum.

During operation, the tubes 4 of the bead feeding unit 3 are filled with the beads 2. The bead feeding unit 3 is provided with rotatable feeding means in the form of a cam 8 comprising pushing segments 10 having pushing edges 11, whereas the cam 8 rotates around the axis of rotation 12 at the speed $\omega 1$. The first guiding plate 5 is stationary, whereas the second guiding plate 6 is rotatable and rotates around the axis of rotation 12 at the speed $\omega 2$ lower than the speed $\omega 1$ of the cam 8.

Figure 4A:
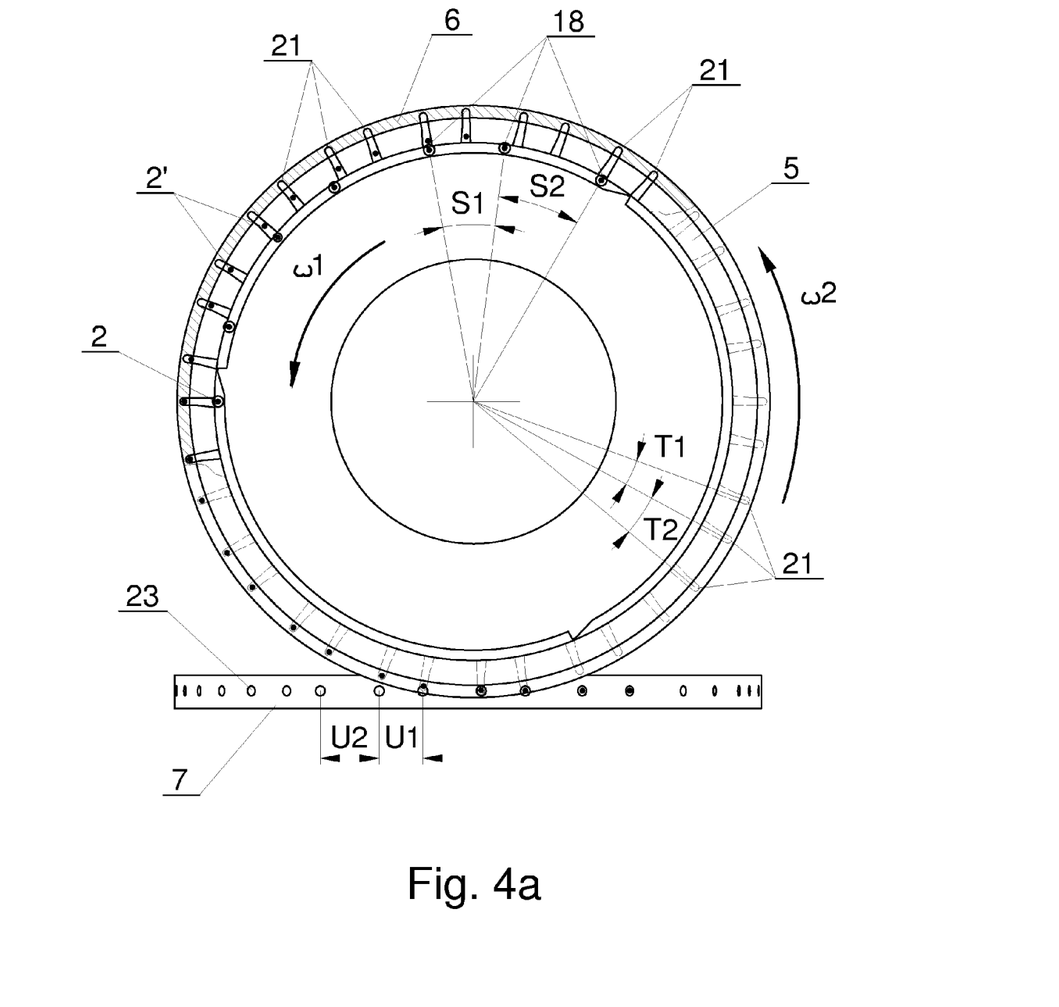
FIG. 4a shows a fragment of a bead feeder in a first embodiment in a top view with marked proportions.

FIG. 4a shows in simplified terms the distances, which are essential for the invention, between the individual subassemblies of the invention. The distances between the receiving pockets 18 have been marked as S1, S2, the distances between the leading away pockets 21 have been marked as T1, T2, whereas the distances between the transport pockets 23 have been marked as U1, U2. In this embodiment of the invention it has been shown how to ensure feeding of the beads into the spaces between unevenly spaced filter segments. All pockets in a configuration for one format, i.e. for a specific sequence of filter segments in a finished product, are spaced at such distances so as to maintain the proportion of distances between the beads placed at specific points between the filter segments or other rod-shaped articles being the products of the tobacco industry. An embodiment in which two distances occur is not a limiting embodiment and the invention is applicable also in case of complex systems in which the beads are to be inserted taking into consideration for example three different distances between the successive bead feeding points.

Figure 5:
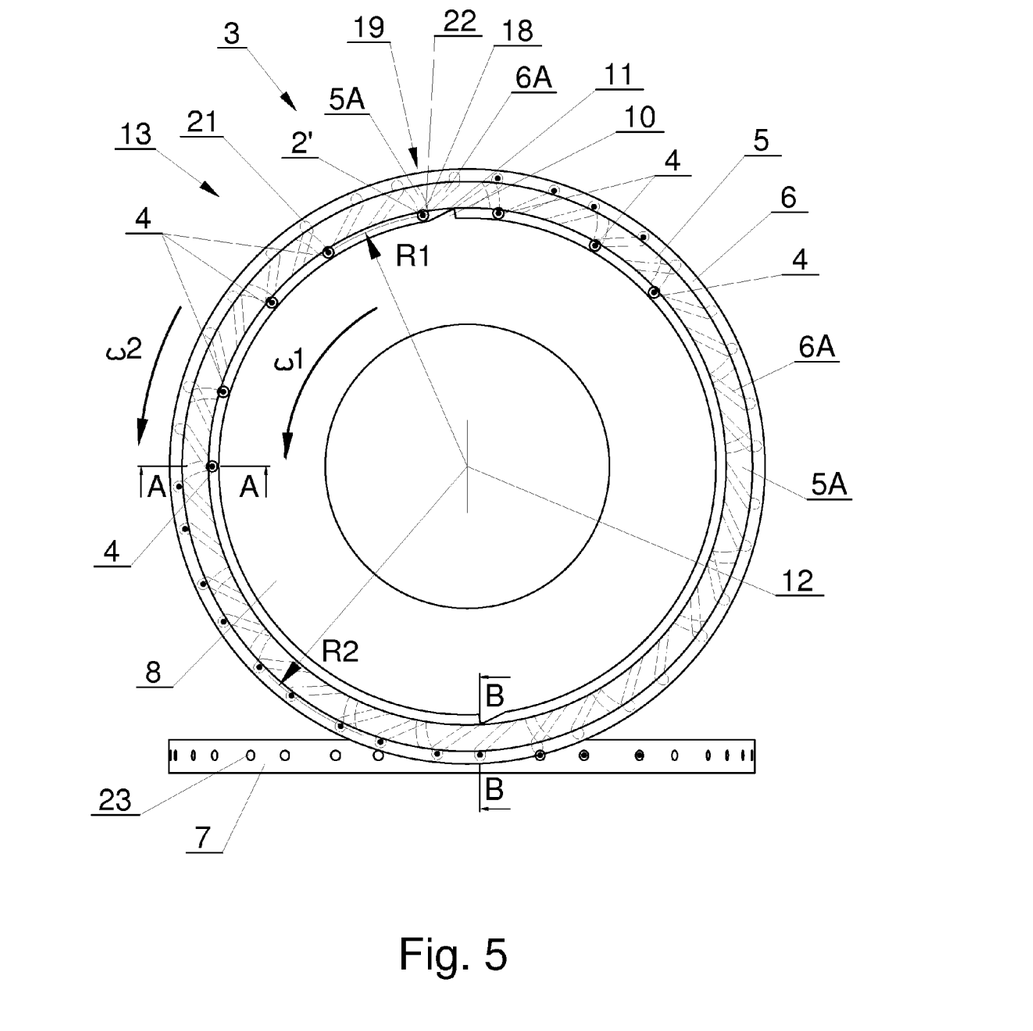
FIG. 5 shows a fragment of a bead feeder in a second embodiment in a top view.

FIG. 5 shows a fragment of a bead 2 feeder 1 in a second embodiment in a top view. A bead 2 feeding unit 3 is provided with a plurality of stationary channels in the form of tubes 4 spaced on an arc with the radius R1, with the said tubes being supplied from the container 2A (in FIG. 1, one bead 2 above the inlet to one of the tubes 4 has been shown). At the outlets of the tubes 4 are situated holding pockets 14 (FIG. 6) from which the beads are transferred to receiving pockets 18 belonging to a unit 13 transferring the beads 2 to the delivery wheel 7, whereas the pockets are situated in the area between a first guiding plate 5 and a second guiding plate 6. After passing through a substantially horizontal guiding channel 19 between the first guiding plate 5 and the second guiding plate 6, the beads are then delivered to leading away pockets 21 moving on an arc with the radius R2. The beads 2 are further transferred to the transport pockets 23 on the circumference of the delivery wheel 7 which places the beads 2 between the filter segments Y1, Y2, Y3, Y4 and Y5 (FIGS. 2 and 3) conveyed along a path 9. For the purpose of holding the beads 2, the transport pockets 23 can be supplied with the vacuum. The guiding channel 19 is formed of two parts, where the guiding channel 19 should be considered as a path which a bead 2' covers between the receiving pocket 18 and the inlet of the leading away pocket 21. The upper part of the guiding channel 19 is defined by a guiding groove 5A shaped on the bottom side of the first guiding plate 5 oriented towards the second guiding plate 6, the lower part of the guiding channel 19 is defined by a guiding groove 6A on the top side of the second guiding plate 6 oriented towards the first guiding plate 5, whereas the grooves 5A and 6A intersect.

During operation, the tubes 4 of the bead feeding unit 3 are filled with the beads 2. The bead feeding unit 3 is provided with rotatable feeding means in the form of a cam 8 comprising pushing segments 10 having pushing edges 11, whereas the cam 8 rotates around the axis of rotation 12 at the speed ω1. The first guiding plate 5 is stationary, whereas the second guiding plate 6 is rotatable and rotates around the axis of rotation 12 at the speed ω2 lower than the speed ω1 of the cam 8. The guiding grooves 5A and 6A of both guiding plates 5 and 6 are shown in broken lines. At the intersection of the grooves 5A and 6A forms a guiding chamber 22 which in view of the direction of rotation of the plate 6 and the orientation of the grooves moves so that the distance of the guiding chamber 22 to the axis of rotation 12 increases between the radius R1 and R2. A solution is also possible where both plates 5 and 6 are rotatable.

Figure 5A:
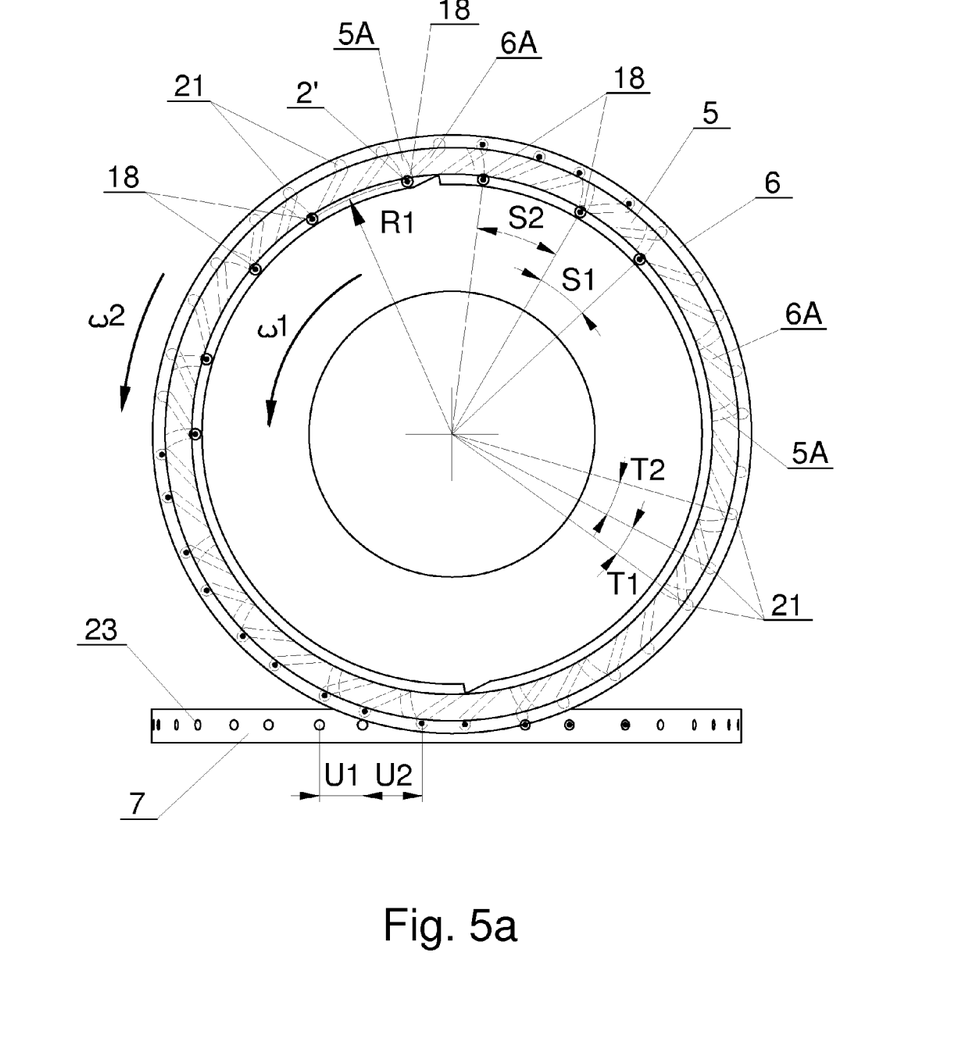
FIG. 5a shows a fragment of a bead feeder in a second embodiment in a top view with marked proportions.

FIG. 5a shows in simplified terms the distances, which are essential for the invention, between the individual subassemblies of the invention. The distances between the receiving pockets 18 have been marked as S1, S2, the distances between the leading away pockets 21 have been marked as T1, T2, whereas the distances between the transport pockets 23 have been marked as U1, U2. In this embodiment of the invention it has been shown how to ensure feeding of the beads into the spaces between unevenly spaced filter segments.

Figure 6:
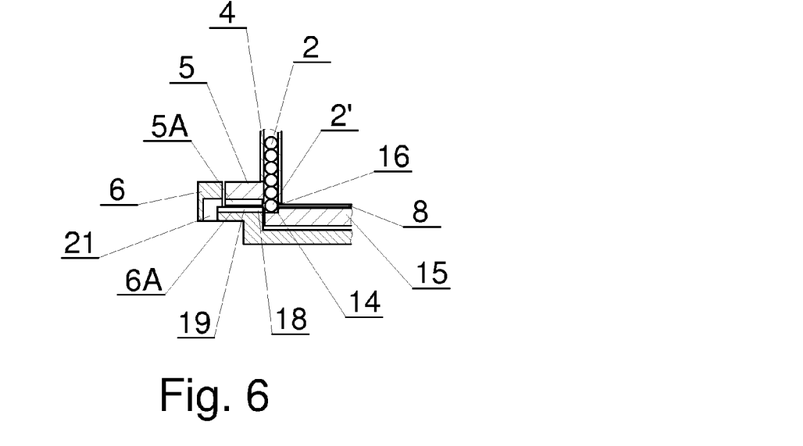
FIG. 6 shows a sectional view of a holding, receiving and picking up pocket in an embodiment of the guiding channel, marked in FIGS. 4 and 5 as A-A, before pushing a bead out of the holding pocket.
Figure 7:
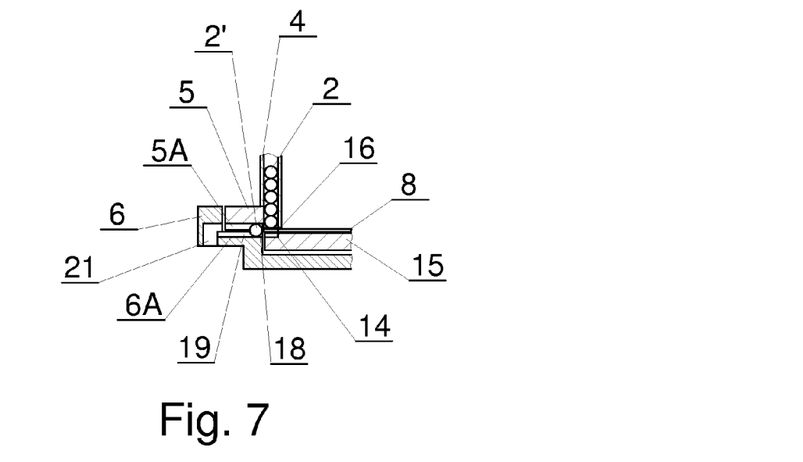
FIG. 7 shows a sectional view of a holding, receiving and picking up pocket in an embodiment of the guiding channel, marked in FIGS. 4 and 5 as A-A, after transferring a bead to a receiving pocket.

FIG. 6 shows a sectional view of any tube 4, where for example in FIG. 4a the section was marked as A-A. The lowermost bead 2' in the bead 2 column is situated in the holding pocket 14 disposed at the outlet of the tube 4, limited from below by a plate 15, and on the sides by a ring 5 and a circumferential edge 16 of the cam 8. FIG. 7 corresponds to a situation where the pushing segment 10 moving on a circular path during the rotation of the cam 8 has passed a successive holding pocket 14 beneath a successive tube 4 and caused pushing the bead 2' out of the holding pocket 14, and the said bead has moved to the receiving pocket 18. The bead 2' will be further transferred substantially horizontally in a guiding channel 19 being the path of movement of the guiding chamber 22, and then to the leading away pocket 21.

Figure 8:
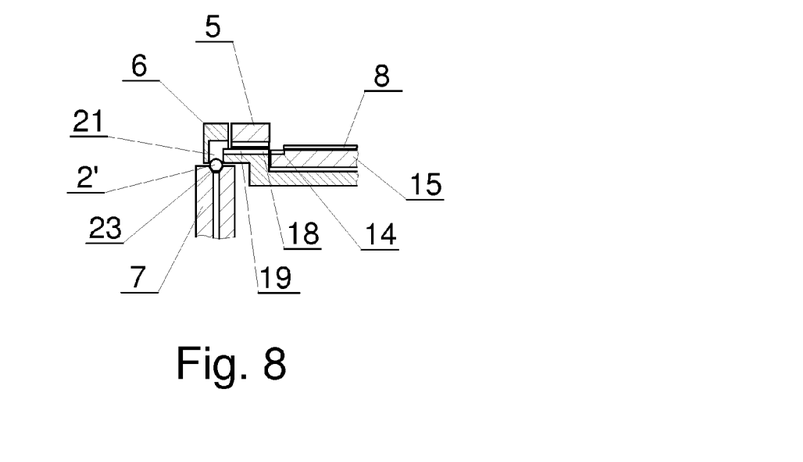
FIG. 8 shows a sectional view of a holding, receiving and picking up pocket in an embodiment of the guiding channel, marked in FIGS. 4 and 5 as B-B, at the moment of transferring a bead to the transport pockets of the delivery wheel.

FIG. 8 shows a sectional view marked in FIG. 4a as B-B where a bead 2 is placed into a transport pocket 23 on the delivery wheel 7 on which it is held in a known way, for example by vacuum force.

FIG. 1 shows, in thick broken lines, the path which a bead covers in the described embodiments. An example bead 2 moves downward from the container 2A in one of the stationary channels in the form of a tube 4 to a holding pocket 14, this section of the path has been marked in the drawing as X1. The next section of the path from the holding pocket 14 through a receiving pocket 18 to a picking up pocket 21 has been marked as X2. In the next section of the path X3 the bead 2 is transferred on an arc in the picking up pocket 21 to the point of transfer of the bead 2 to a transport pocket 23 on a delivery wheel 7. Then the bead 2 in the section X4 is moved in the transport pocket 23 on the delivery wheel 7. Afterwards it is placed between the filter segments on a path 9 and further moves together with the filter segments along the last section of the path X5.

The unit according to the invention has a wide application to bead feeding into the spaces between the successive filter segments of a segment filter, in particular to bead feeding into spaces arranged at different distances in so-called asymmetric configurations. A typical problem to be solved by a specialist in the field of manufacture of the tobacco industry products in order to engineer a manufacturing machine will be an appropriate arrangement of known devices supplying rod-shaped articles or the filter material along the path 9 as well as of devices picking up a sequence of rod-shaped articles and wrapping it into a paper wrapper.

The invention claimed is:

1. A unit for uneven transferring of a stream of beads (2) in tobacco industry machines, from receiving pockets (18) to leading away pockets (21), through guiding grooves disposed on guiding plates, comprising
    a first guiding plate (5) and a second guiding plate (6) situated on top of each other, whereas a guiding groove (5A) of the first guiding plate (5) and a guiding groove (6A) of the second guiding plate (6) intersect forming at least one radially moving bead guiding chamber,
    whereas at least one of the first guiding plate (5) and the second guiding plate (6) is rotationally movable, wherein the receiving pockets (18) are disposed along a circumference of the first guiding plate (5) so that angular distances (S1, S2) between successive receiving pockets (18) are different from each other and alternate repetitively, and the leading away pockets (21) are disposed along a circumference of the second guiding plate (6) so that angular distances (T1, T2) between successive leading away pockets (21) are different from each other and alternate repetitively.

2. The unit of claim 1 wherein a proportion of the angular distances (S1, S2) between the successive receiving pockets (18) is equal to a proportion of the angular distances (T1, T2) between the successive leading away pockets (21).

3. The unit of claim 2 wherein a delivery wheel (7) is provided with transport pockets (23) spaced at angular distances that a proportion of angular distances (U1, U2) between successive transport pockets (23) is equal to the proportion of the angular distances (S1, S2) between the successive receiving pockets (18) and equal to a proportion of the angular distances (T1, T2) between the successive leading away pockets (21).

4. The unit of claim 1 wherein a delivery wheel (7) is provided with transport pockets (23) spaced at such angular distances that a proportion of angular distances (U1, U2) between successive transport pockets (23) is equal to a proportion of the angular distances (S1, S2) between the successive receiving pockets (18) and equal to a proportion of the angular distances (T1, T2) between the successive leading away pockets (21).

* * * * *